Nov. 21, 1967  A. MILLER  3,353,812
BUMPERS
Filed Oct. 20, 1965
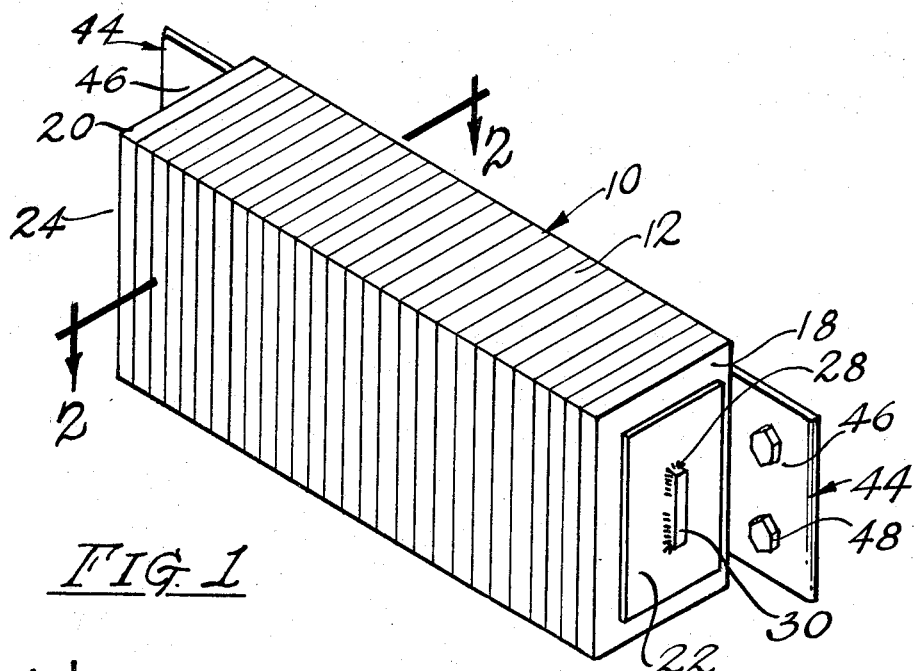
FIG. 1
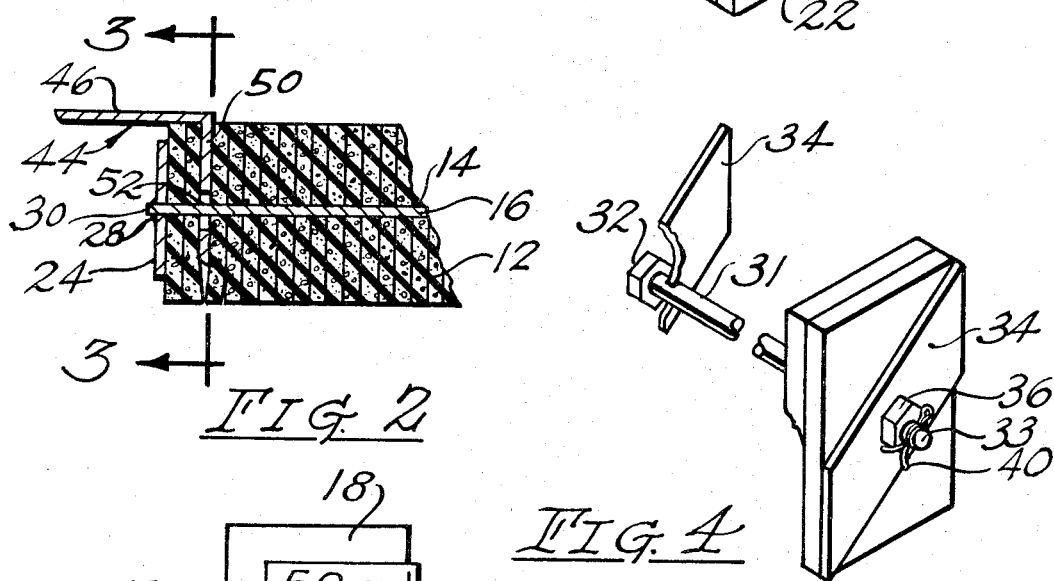
FIG. 2
FIG. 4
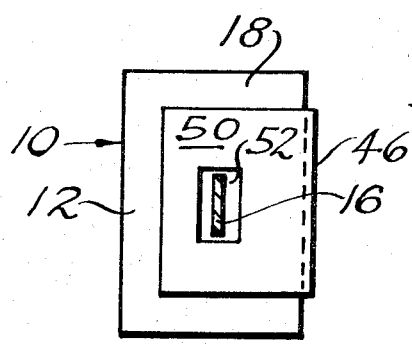
FIG. 3
INVENTOR
ALVIN MILLER
BY
ATTORNEY

United States Patent Office 3,353,812
Patented Nov. 21, 1967

3,353,812
BUMPERS
Alvin Miller, 776 McDaniel St. SW., Atlanta, Ga. 30310
Filed Oct. 20, 1965, Ser. No. 498,509
5 Claims. (Cl. 267—1)

ABSTRACT OF THE DISCLOSURE

A bumper constructed from a plurality of stacked rubber strips resiliently mounted and supported for attachment on a marine dock, loading dock and the like, by means of supports at least one of which is loosely mounted on the bumper.

---

The use of rubber tires and also pieces of rubber tires put together and fashioned in different ways is well known in the art of marine dock bumpers and loading bumpers. The art of cutting tires into almost flat sections and stacking these sections together to create a flexible and/or resilient stack is also well known in the art. Since bumpers of this sort sometimes receive tremendous shocks and impacts from landing craft or large vehicles, and this impact force ultimately at least to some extent being transferred to the dock on which the bumper is mounted, the particular arrangement for assembling and retaining the stack is significant as well as the particular way that the entire assembled stack is supported on the dock. The present invention is directed to these aspects of the bumper. For example, in some prior art devices the bumper is assembled as a rigid stack and the rigid stack is rigidly connected to the dock. This presents a rigid structure which transfers the force of impact to the support means for the bumper and to the fastening means to the dock. It is considerable desirable, however, to support the bumper with some amount of permitted movement whereby sudden forces or impacts cause relative motion between the bumper stack and the means for attaching same to the dock.

A primary object of this invention is to provide a dock bumper constructed from a plurality of flexible strips such as rubber and having a support means for said stack which permit some relative motion from impact.

Another object of this invention resides in the construction and location of the support means which allows some flexibility in the distance the support means occupies from the end of the stack.

Another object of this invention resides in the simplicity of construction whereby the strips may be assembled and the support means may be assembled therewith ready for attachment by lag screws or other fastening means to the dock.

Still another object of this invention resides in the support means for the stack of flexible strips which comprise brackets that are assembled as part of the stack.

Other and further objects and advantages of my invention will become apparent upon reading the following specification taken in conjunction with the accompanying drawings, in which:

FIG. 1 is a perspective view of a dock bumper constructed in accordance with the present invention.

FIG. 2 is a cross-sectional view taken substantially along lines 2—2 in FIG. 1.

FIG. 3 is a cross-sectional view taken substantially along lines 3—3 in FIG. 2.

FIG. 4 is a perspective view of a modified form of the invention with some portions omitted and some broken.

The process or method for taking automobile, truck and other tires and cutting and arranging them in to individual sections of what amounts to tire cord and rubber and the like is well known and is used in a number of applications such as floor mats, marine fenders and dock bumpers and the like. Therefore, the present invention assumes that the present dock bumper may be constructed from such material or form any other substitutable material.

The complete and assembled dock bumper is represented overall and generally by reference numeral 10 in FIG. 1 and comprises a plurality of individually and substantially quadrilateral, rubber-like strips 12 which may include reinforcement wire or tire cord and are generally of a tough and flexible constuction such as that removed from vehicle tires. Each of the many individual members 12 is provided with a flexible aperture 14, as by drilling or cutting or punching or otherwise and all of the members 12 are substantially the same size and shape preferably and the central aperture 14 located substantially in the same position on each so that when placed in a stack as shown in FIGS. 1, 2 and 3, the central aperture 14 aligns with all of the other apertures 14 and provides a longitudinal opening through all of the stacks of like members 12. Such members 12 are resilient and flexible to some extent and may be pressed together in the stack, as by means of a hydraulic press or a similar apparatus, and under such assembly has inserted therethrough the longitudinal assembly rod and central connecting member 16 which in the present invention is in the form of a flat steel rod or bar inserted through all of the aligned openings 14 to the outside of each end 18, 20 respectively, of the stack of like member 12. On each end of the stack there is applied while the stack of members 12 is assembled in pressure relationship and stacked, clamping plate or the active member 22, 24, respectively on each respective end of the stack, and which in the present invention is attached to each end through the use of a central aperture 28 in each of the respective members 22, 24 into which is inserted the end 30 of the rod 16 and which end 30 is welded to the respective plates 22, 24 while the stack of members 12 is under pressure.

As shown in FIG. 4, in place of the rod 16 there may be inserted through the stack members 12 which are assembled in the same manner in relationship, a longitudinal screw-threaded rod 31 having an ordinary carriage bolt, an ordinary screw head 32 on one end of the rod 31 and a screw-threaded end 33 on the other end. In place of the plate 22, 24, if desired, a washer or different plate member 34 may be used as shown in FIG. 4 having an opening therein through which the rod 30 is inserted. A nut 36 is screwed to the end 33 of rod 31 thereby pressing the stack in place. A common lock washer may be used or any one of well known vibration proof nuts 31 may be used or the end of the rod 30 may be drilled and provided with a cotter key 40 through the rod 32 to prevent the vibration and use from causing the nut to disengage from the rod.

A pair of identical support brackets 44, there being one at each end of the stack 12, each comprises plate member 46 having openings therein to accommodate lag screws 48, or any other attachment means, and each bracket 44 has an angularly displaced attachment member 50 which is provided with an opening 52 substantially in the center thereof. Prior to the assembly of the plates 22 on the rod 16, each one of the support brackets is loosely mounted on the rod 16 between some of the individual stack members 12 at a selected distance from the end of the stack at plates 22, 24. This provides a loose, somewhat resilient connection between the entire assembled dock bumper 10 and the dock to which it is assembled because the support brackets 44 are each loosely and resiliently supported between some of the stack members 12. Although the stack members 12 are tightly pushed together and fastened in place under pressure, each is a piece of resilient automobile tire or similar material and will compress as well as bend and forces which have vectors that are resolved against the stack of members 12 will cause some slight motion of the attachment bracket 44 with respect to the center rod 16. Thus, a sudden impact, as from a heavy boat or tractor trailer truck, is not transmitted directly to the dock but causes some displacement of the stack 12 with respect to the attachment brackets 44 which are tightly controlled due to the confinement of the bracket portions 50 inside of the stack members 12.

While I have shown and described a particular form of my invention together with one modification, and suggested substitutions, this is by way of illustration only and does not constitute the only forms of the invention, since various substitutions, changes, eliminations, variations, departures, modifications and revisions may be made therein without departing from the scope of my invention as defined in the appended claims.

I claim:
1. In a dock bumper or the like to be attached to a substantially rigid surface such as a boat dock or loading dock:
   (a) a longitudinal stack assembly comprising a plurality of individual, resilient, cushion-like members constructed from rubber-like material, such as cut vehicle tires,
   (b) a plurality of spaced support brackets on said bumper and at least one support bracket being movably connected to the stack near a respective end and each support bracket having a support portion extending from the end of a respective end of the stack with apertures therein to receive attachment means such as lag screws and the like,
   (c) and a stack assembly means assembling said stack.

2. In a dock bumper or the like to be attached to a substantially rigid surface such as a boat dock or loading dock:
   (a) a longitudinal stack assembly comprising a plurality of individual, resilient, cushion-like members constructed from rubber-like material such as cut vehicle tires,
   (b) a plurality of spaced support brackets on said bumper and at least one support bracket having an attachment portion extending inwardly into said individual stack members, and each support bracket having a support portion extending from the end of a respective end of the stack with apertures therein to receive attachment means such as lag screws and the like, said brackets movably connected to,
   (c) a stack member extending through all of said stack members, said support bracket extending inwardly into said stack members having a portion loosely mounted on said stack member whereby there is at least limited relative movement between said stack member and said support bracket when said bumper stack is sufficiently struck by a force such as a large truck and the like,
   (d) and a stack assembly means assembling said stack.

3. In a dock bumper or the like to be attached to a substantially rigid surface such as a boat dock or loading dock:
   (a) a longitudinal stack assembly comprising a plurality of individual, resilient, cushion-like members constructed from rubber-like material such as cut vehicle tires,
   (b) a plurality of identical support brackets at least one support bracket having an attachment portion extending inwardly between said individual stack members, and each support bracket having a support portion extending from the end of a respective end of the stack with apertures therein to receive attachment means such as lag screw and the like,
   (c) a stack assembly member extending through all of said stack members movably engaging said attachment portion of said support bracket extending between said individual stack members,
   (d) and a stack assembly means assembling said stack and confining said attachment portion of said bracket therein.

4. In a dock bumper or the like to be attached to a substantially rigid surface such as a boat dock or loading dock:
   (a) a longitudinal stack assembly comprising a plurality of individual, resilient, cushion-like members constructed from rubber-like material such as cut vehicle tires,
   (b) a plurality of identical support brackets each having an attachment portion extending inwardly between said individual stack members and each support bracket having a support portion extending from the end of a respective end of the stack with apertures therein to receive attachment means such as lag screws and the like,
   (c) a central stack assembly member extending through all of said stack members and said member extending through and loosely engaging said attachment portion of said support bracket,
   (d) and a stack assembly member rigidly attached to one end of said longitudinal assembly member and engaging the stack at that end, and a stack assembly member rigidly attached to said rod at the other end thereof and engaging the stack at that end,
      said stack members being assembled under pressure and confining said attachment portion of said bracket therein.

5. In a dock bumper or the like to be attached to a substantially rigid surface such as a boat dock or loading dock:
   (a) a longitudinal stack assembly comprising a plurality of individual, resilient, cushion-like members constructed from rubber-like material such as cut vehicle tires, there being an aperture in each of said members and all of said members together having said apertures aligned to form a central, longitudinal passageway therethrough,
   (b) a plurality of identical support brackets each having an attachment portion extending inwardly between said individual stack members and beyond the center apertures therein, and each support bracket having a support portion extending from the end of a respective end of the stack with apertures therein to receive attachment means such as lag screws and the like,
   (c) a central stack assembly member extending through all of said stack members through longitudinal opening through assembly of stack members and said member extending through and loosely engaging said attachment portion of said support bracket,
   (d) and a stack assembly member rigidly attached to one end of said longitudinal assembly member and engaging the stack at that end, and a stack assembly member rigidly attached to said rod at the other end thereof and engaging the stack at that end,
   (e) said stack members being assembled under pressure and confining said attachment portion of said bracket therein.

References Cited
UNITED STATES PATENTS

| | | | |
|---|---|---|---|
| Re. 24,276 | 2/1957 | Schuyler | 267—1 |
| 3,063,700 | 11/1962 | Talbott et al. | 267—1 |
| 3,107,642 | 10/1963 | Lakin | 267—1 |
| 3,165,305 | 1/1965 | Peleger | 267—1 |

ARTHUR L. LA POINT, *Primary Examiner.*

R. M. WOHLFARTH, *Assistant Examiner.*